US009319456B2

(12) United States Patent
Gilder

(10) Patent No.: US 9,319,456 B2
(45) Date of Patent: Apr. 19, 2016

(54) "GO HOME" FEATURE FOR ROAMING APPLICATIONS

(75) Inventor: Nathaniel A. Gilder, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 346 days.

(21) Appl. No.: 13/816,552

(22) PCT Filed: Mar. 29, 2011

(86) PCT No.: PCT/US2011/030344
§ 371 (c)(1),
(2), (4) Date: Feb. 12, 2013

(87) PCT Pub. No.: WO2012/134453
PCT Pub. Date: Oct. 4, 2012

(65) Prior Publication Data
US 2013/0138794 A1 May 30, 2013

(51) Int. Cl.
*G06F 15/16* (2006.01)
*H04L 29/08* (2006.01)
*G06F 9/48* (2006.01)

(52) U.S. Cl.
CPC .............. *H04L 67/10* (2013.01); *G06F 9/4862* (2013.01)

(58) Field of Classification Search
CPC ..... H04L 67/04; H04L 67/2823; H04L 67/10; H04L 67/125; H04L 67/34; G06F 21/10
See application file for complete search history.

(56) References Cited

U.S. PATENT DOCUMENTS

| 5,495,411 | A | * | 2/1996 | Ananda | G06F 21/125 |
| | | | | | 705/32 |
| 6,233,601 | B1 | * | 5/2001 | Walsh | G06F 9/465 |
| | | | | | 709/202 |
| 7,676,823 | B2 | | 3/2010 | Acharya et al. | |
| 8,370,493 | B2 | * | 2/2013 | Sirota | G06F 9/485 |
| | | | | | 709/201 |

(Continued)

FOREIGN PATENT DOCUMENTS

| CN | 1570904 A | 1/2005 |
| CN | 100545851 C | 9/2009 |
| WO | PCT/US11/30344 | 10/2012 |

OTHER PUBLICATIONS

International Searching Authority, International Search Report and Written Opinion of The International Searching Authority for PCT/US11/30344, Nov. 26, 2012.

(Continued)

*Primary Examiner* — Brian J Gillis
*Assistant Examiner* — Kamran Mohammadi
(74) *Attorney, Agent, or Firm* — Jensen & Puntigam, PS

(57) ABSTRACT

Techniques related to a "go home" feature for a roaming application are generally described where a roaming application can automatically return from a target device to a home device. The home device can manage an execution environment for the roaming application on behalf of an owner of the roaming application. The roaming application may roam from the home device to a target device, execute on the target device, and automatically return from the target device to the home device, in response to a return event. The roaming application implementing the "go home" feature may be indifferent to specific User Interface (UI) features of target devices, allowing roaming applications to access a wider diversity of potential target devices, and also allowing simplification/omission of target device UI.

16 Claims, 7 Drawing Sheets

(56) References Cited

U.S. PATENT DOCUMENTS

| | | | |
|---|---|---|---|
| 8,893,118 B2* | 11/2014 | Guminy | G06F 8/70 717/168 |
| 2002/0129126 A1* | 9/2002 | Chu | G06F 8/20 709/220 |
| 2005/0198648 A1 | 9/2005 | Wray et al. | |
| 2006/0031529 A1* | 2/2006 | Keith, Jr. | H04L 67/1095 709/227 |
| 2006/0230128 A1 | 10/2006 | Chung et al. | |
| 2008/0178143 A1 | 7/2008 | Dougan et al. | |
| 2010/0234022 A1 | 9/2010 | Winterbottom | |
| 2011/0173644 A1* | 7/2011 | Teng | G06F 3/1415 719/329 |
| 2013/0167242 A1* | 6/2013 | Paliwal | G06F 21/12 726/26 |

OTHER PUBLICATIONS

Takashio et al; A Mobile Agent Framework for Follow-Me Applications in Ubiquitous Computing Environment; paper; Abstract: 2001 International Conference on Distributed Computing Systems Workshop; Apr. 2001; Mesa AZ.

Yu et al; Mobile Agent Enabled Application Mobility for Pervasive Computing; Abstract; Proceedings of Ubiquitous Intelligence and Computing 2006UIC06 (2006) vol. 4159; Springer Berlin/Heidelberg.

Lepreux et al; Visual Design of User Interfaces by (De)composition; journal pp. 157-170; Springer-Verlag Berlin Heidelberg 2007.

Chu et al; Roam, A Seamless Application Framework; journal; Mar. 7, 2003; 18 pages; The Journal of Systems and Software (2003); US.

Gaeremynck et al; More for Less: Model Recovery from Visual Interfaces for Multi-Device Application Design; Article; Jan. 2003; Miami FL; IBM TJ Watson Research Center.

Agileball et al; Mobile Agent; internet article from http://en.wikipedia.org/w/index.php/oldid=346752242; accessed Oct. 21, 2010.

\* cited by examiner

# "GO HOME" FEATURE FOR ROAMING APPLICATIONS

CROSS-REFERENCE TO RELATED APPLICATIONS APPLICATION

This is a U.S. National Stage Application filing under 35U.S.C. §371of International Application PCT/US11/30344, entitled "GO HOME" FEATURE FOR ROAMING APPLICATIONS, filed on Mar. 29, 2011, which is incorporated by reference herein in its entirety.

BACKGROUND

Unless otherwise indicated herein, the materials described in this section are not prior art to the claims in this application and are not admitted to be prior art by inclusion in this section.

Many objects today have embedded computer processors, and in the future, this trend is expected to continue and accelerate. Devices will be increasingly ubiquitous, increasingly powerful, and increasingly interconnected and capable of communicating with each other. While there are many potential benefits of environments in which we are surrounded by powerful, interconnected devices, many technical challenges remain. Allowing users to constructively interact with and control the various devices in their environment presents technical challenges. Similarly, allowing software applications to roam between, interact with and control multiple devices presents technical challenges for the electronics and software industries.

SUMMARY

The present disclosure describes methods, devices and computer readable media relating to a "go home" feature for roaming applications. Some example computer readable media may comprise computer executable instructions configured to automatically initiate a return of a roaming application from a target device to a home device. The home device provides an execution environment for the roaming application on behalf of an owner of the roaming application, and the roaming application may temporarily roam to a target device and return to the home device. The instructions may implement roaming application modules configured to execute on the home device, to roam from the home device to a target device, to execute on the target device, and to return from the target device to the home device. The instructions may furthermore implement modules configured to automatically initiate the return of the roaming application from the target device to the home device in response to a return event. The return event may comprise, for example, a timer reaching a designated value, completion of a designated task, a return signal from the home device, and/or a failure in the target device. An additional module may be configured to override the return of the roaming application from the target device to the home device, in response to a user command. Also, a module may be configured to automatically initiate a roam by the roaming application from the target device to a server, in response to a failure to return to the home device.

Some example devices may comprise home devices configured to provide an execution environment for a roaming application on behalf of an owner of the roaming application. Such a device may include a processor, a memory, and an operating system loadable into the memory and configured to execute on the processor. The operating system may be configured to provide an execution environment for the roaming application as it executes at the home device, as well as to transfer the roaming application from the home device to a target device, for example, in response to user command received at the home device. The operating system may also be configured to initiate return of the roaming application from the target device to the home device, for example by sending a communication to the target device in response to a return event. In this scenario the return event may comprise, for example, a user command, a timer reaching a designated value, and/or an interruption or degradation of signal quality on a communication channel used by the home device to communicate with the target device, e.g., due to a wireless range between the home device and the target device. The operating system may also comprise instructions to retrieve the roaming application from a server, in response to a failure of the roaming application to return to the home device.

Some example devices may comprise target devices configured to provide an execution environment for a roaming application, and configured to return the roaming application to a home device associated with an owner of the roaming application. Such a device may include a processor, a memory, and operating system loadable into the memory and configured to execute on the processor. The operating system may be configured to provide an execution environment for the roaming application as it executes at the target device, as well as transfer the roaming application from the target device to the home device. The operating system may also be configured to initiate return of the roaming application from the target device to the home device in response to a return event. In this scenario the return event may comprise, for example, an automatically initiated return command from the roaming application, a timer reaching a designated value, an interruption or degradation of signal quality on a communication channel used by the home device to communicate with the target device, a completion of a designated task, a return signal from the home device, and/or a failure in the target device. The operating system may also comprise instructions to automatically transfer the roaming application from the target device to a server, in response to a failure to return the roaming application to the home device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7, including

DETAILED DESCRIPTION

Figure 1:
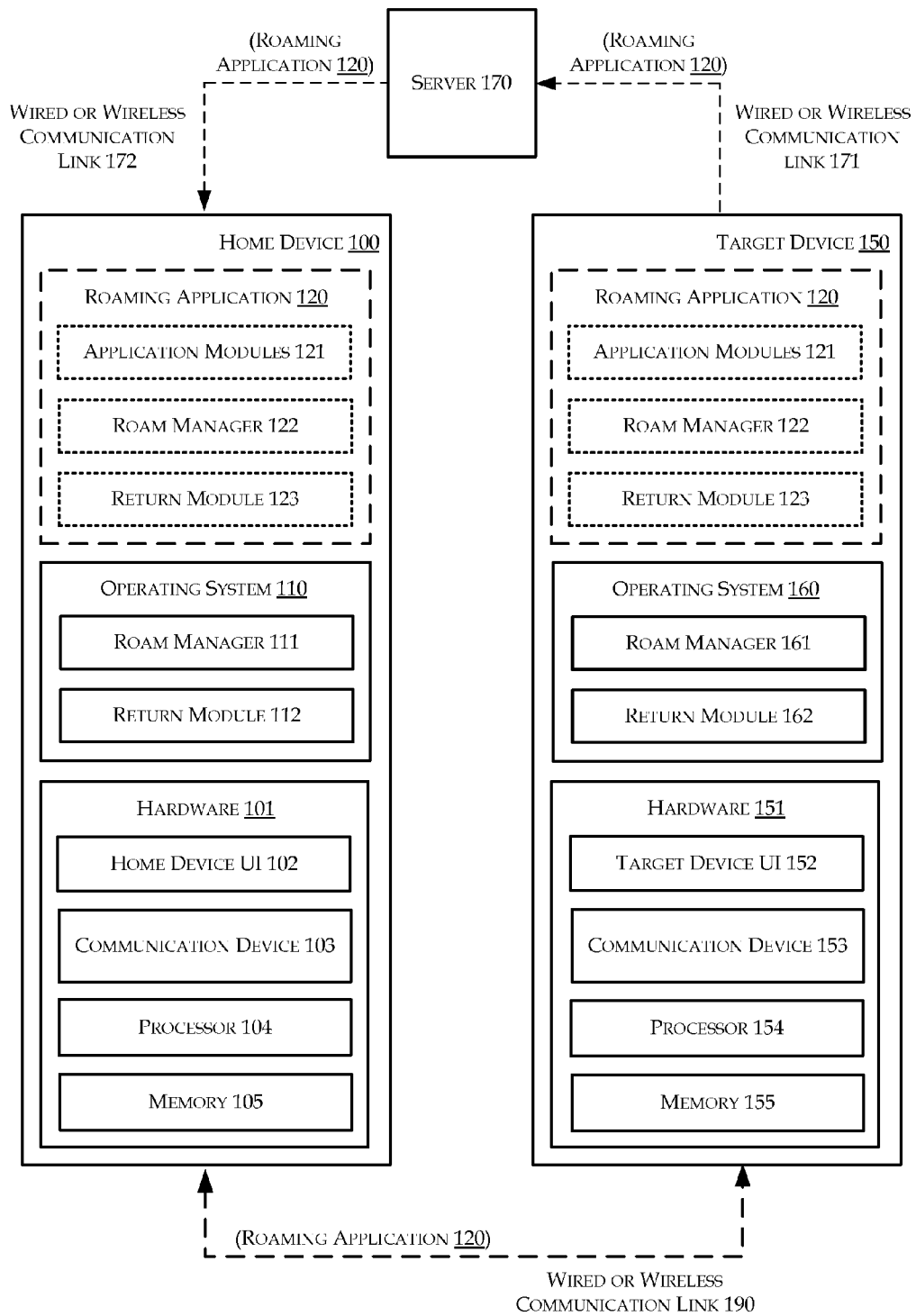
FIG. 1 is a diagram illustrating an example home device, target device, server, and roaming application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to methods, devices, and/or computer readable media related to a "go home" feature for roaming applications. The "go home" feature may allow a roaming application to automatically return from a target device to a home device. The home device provides an execution environment for the roaming application on behalf of an owner of the roaming application. The roaming application may roam from the home device to a target device, execute on the target device, and automatically return from the target device to the home device, in response to a return event. A roaming application implementing the "go home" feature need not be encumbered by a lack of adequate User Interface (UI) features of target devices, allowing roaming applications to access a wider diversity of potential target devices, and also allowing simplification/omission of target device UI.

FIG. 1 is a diagram illustrating an example home device, target device, server, and roaming application, in accordance with at least some embodiments of the present disclosure. Home device 100 may comprise hardware 101 and operating system 110. Hardware 101 may comprise home device UI 102, communication device 103, processor 104 and memory 105. Home device operating system 110 may comprise roam manager 111 and return module 112. Target device 150 may comprise hardware 151 and operating system 160. Hardware 151 may comprise target device UI 152, communication device 153, processor 154 and memory 155. Target device operating system 160 may comprise roam manager 161 and return module 162. Roaming application 120 may comprise application module(s) 121, roam manager 122, and return module 123. The roaming application 120 is illustrated using dashed lines within home device 100 as well as within target device 150, to indicate that the roaming application 120 may be configured to execute at the home device 100, e.g., prior to roaming to the target device 150, and may be configured to execute at the target device 150, e.g., prior to returning to the home device 100.

In FIG. 1, home device 100 may be configured to communicate with target device 150 via wired or wireless communication link 190, allowing the roaming application 120 to roam from the home device 100 to the target device 150, and to subsequently return to the home device 100. Target device 150 may be configured to communicate with server 170 via wired or wireless communication link 171, allowing the roaming application 120 and/or roaming application data to be transmitted from the target device 150 to the server 170. Home device 100 may be configured to communicate with server 170 via wired or wireless communication link 172, allowing the roaming application 120 and/or roaming application data to be transmitted from the server 170 to the home device 100, as described in greater detail herein.

In FIG. 1, the roaming application 120 may be adapted to execute on the home device 100. Upon the occurrence of a roam initiating event, e.g., a user entering a roam command via the home device UI 102, the roaming application 120 may roam to the target device 150, and may continue executing at the target device 150. Depending on the specific embodiment, the roam operation may be carried out by one or more of the roam managers 122, 111, 161, and/or some combination thereof. Upon the occurrence of a return event, e.g., a timer reaching a predetermined value, one or more of the return modules 123, 112, 162, and/or some combination thereof may be adapted to automatically initiate a return of the roaming application 120 to the home device 100. As with the initial roam to the target device 150, depending on the specific embodiment, the return operation may be carried out by one or more of the roam managers 122, 111, 161, and/or some combination thereof. Upon successful return, the roaming application 120 may continue executing on the home device 100.

In some embodiments, roam managers 122, 111, and/or 161 may be configured to return the roaming application 120, or some roaming application data, to the server 170 in the event that the roam managers 122, 111, and/or 161 are unable to return the roaming application 120 to the home device 100. The home device 100 may connect to the server 170 and retrieve the roaming application 120 or associated data, in lieu of recovering the roaming application 120 from the target device 150.

With regard to a "go home" feature for roaming applications in general, "roaming" applications may roam from device to device, optionally allowing users to interact with an application via different devices in the field, and optionally allowing applications to control devices in a user's environment according to user and/or application specifications and commands.

In some embodiments, roaming applications may be adapted to take advantage of so-called Ubiquitous Computing (UBICOMP) environments, through their ability to roam among different execution environments, even during the lifetime of the application's execution. For example, a user of a handheld device running a roaming application that analyzes product inventory might walk through a shop floor, and come across another computing device coupled to a larger display that is more appropriate for viewing charts and graphs. The user may interact with a UI on the handheld device to cause the roaming application to roam to the device with the larger display. The user may view and interact with the roaming application as it executes in the execution environment provided by the device coupled to the larger display. The user may then interact with a UI on the handheld device to retrieve the roaming application to the handheld device and continue walking through the shop.

In some UBICOMP environments, applications may be adapted to run in a heterogeneous environment including, for example, different display sizes and types, different input devices and sensors, and different machine architectures. Such resources may be automatically discovered by the roaming application during its execution, and the application and/ or operating systems of devices that host the roaming application may determine how and when to best use these resources, and how to migrate the application from one environment to the next.

When a roaming application roams from one device to another, e.g., from a smart phone home device to a tabletop display target device, the target device may or may not have adequate UI capabilities to allow the user to interact with the roaming application via target device UI. When a target device does not have adequate UI to allow the user to interact with the roaming application via target device UI, and if the roaming application does not include a "go home" feature as described herein, the user may be unable to command the roaming application to return to the home device. The user may instead restart the roaming application on his or her home device, losing any state changes that occurred and/or data that was collected during roam to the target device.

In some embodiments, a roaming application can be configured to automatically attempt to "go home" to a home device, such as a smart phone or laptop that is registered as a home device for the roaming application. When roaming from the home device, the roaming application may for example be permitted to spend some predetermined interval at a target device, after which the roaming application may attempt to go home. A variety of configuration options are possible. A roaming application may be configured to automatically attempt to go home after a preset time interval has expired, after completion of a task, and/or in response to an alternate channel instruction to go home. An alternate channel instruction to go home may comprise, for example, an instruction that is received at the target device via a channel other than target device UI, such as a return command from the home device as described herein. The roaming application may be configured to temporarily roam to a server and continue executing in the execution environment provided by the server, and/or save application information and/or other data to a server, without executing on the server, if the roaming application cannot go directly back to the home device. Saving application information to a server may include, for example, generating acquiring application information as described in connection FIG. 3, block 363, and transmitting one or more application information files to the server.

In some embodiments, a roaming application may be configured to register a Global Unique Identifier (GUID), an IP address, or some other identifier of a home device, allowing the roaming application to identify and return to its registered home device. Upon roaming away from the home device, the roaming application may be configured to start a roam session timer. When the timer reaches some predetermined value (the specific predetermined value may depend on the nature of the application), the roaming application may be configured to display a popup UI on the display of the target device that says, for example, "Select OK to continue Roaming Session. The application will go home automatically in [60] seconds." If the user selects "OK" then the roaming application may be configured to reset the roam session timer. If the user selects another UI button such as a "Go Home Now" button, then the roaming application may be configured to attempt to return to the home device immediately, identified by the GUID, registered IP address, and/or other identifier of the home device. If desirable, a "Turn Off Roam Session Timer" button may also be provided in the popup UI, to disable the roam session timer for the duration of the roam session. In some embodiments, e.g., for roaming applications that are designed specifically for one or more tasks, a roaming application may be configured to display a popup UI at the target device, upon completion of a task at the target device, similar to the above described UI that may be displayed when the timer reaches a predetermined value.

In some embodiments, which may be implemented alongside the timer/task completion-type embodiments described above, a roaming application may be configured to respond to an alternate channel instruction to go home. An alternate channel instruction may comprise an instruction received from a device other than the target device on which the roaming application is presently executing. This is referred to as an "alternate channel instruction" because it is a channel for interacting with a roaming application other than through a target device UI. The target device UI, when adequate to support interacting with a roaming application, may provide a primary channel for interacting with a roaming application as it executes on the target device. In one example, the home device may be configured to remotely (either wired or wirelessly) send an alternate channel instruction to the roaming application, instructing the roaming application to go home.

The alternate channel instruction may be implemented using a same communication link as that used to initially transfer the roaming application to the target device. For example, in a scenario in which an application roams via a wireless communication link to a target device, a same wireless communication link may be used for a subsequent "go home" instruction. Instructions may be transmitted using any of a number of protocols which are currently available, or as may be developed in the future. For example, a variety of application layer protocols, transport layer protocols, internet layer protocols, and link layer protocols are commonly used for communications between devices, any of which may be leveraged as appropriate for specific embodiments.

The target device may be configured to include a feature for transmitting alternate channel communications from the home device to the roaming application and/or target device operating system. Upon receiving an instruction to go home, the target device may be configured to initiate return of the roaming application and/or to forward the instruction to the roaming application, and the roaming application may in turn be configured to initiate its return to the home device.

When a communication link to a home device is lost, so that the roaming application cannot go directly back to the home device, the roaming application may be configured to temporarily roam to a known server location, from which it may be configured to return to the home device at such time as the home device links to the server. As an alternative to "roaming" to the server and then back to the home device while continuing to execute, the roaming application may be configured to save application information and/or other application data to the server, and shut itself down at the target device. Saving application information to a server may include, for example, generating an application information file as described in connection FIG. 3, block 363, and transmitting the application information file to the server. Similarly, in various configurations described herein, transferring application information may be employed as an alternative to roaming back to a home device and continuing to execute at the home device.

A variety of example uses for this technology might be suggested. In a business setting, a person giving a presentation might instruct the presentation application, through a UI, to roam to a large display so that others can view the presentation. The presenter may not have access to the display UI for causing the presentation application to return the home device, or to roam to a different display. The technology described herein may be used to cause the presentation application to return to a home device and/or to another target device. In a social/entertainment setting, a roaming application may provide a virtual pet that the owner can bring to gathering places, e.g., on a smart phone. The virtual pet may roam among a variety of devices at the social gathering, and the owner may not have access to, or may not know which devices the virtual pet has roamed to. The technology described herein may be used to cause the virtual pet application to return to a home device and/or to roam to another target device.

The disclosed technology also may have implications related to software licensing. For example, some roaming application developers may be concerned that if their application is permitted to roam, and the application is simultaneously re-started on a home device, multiple instances of the application could be used in violation of the application's terms of use. However, applications can be adapted in accordance with various techniques described herein such that the applications will not roam indefinitely and instead are required to "go home" after the completion of a task, expiration of a predetermined time interval or upon the occurrence of some other return event. If an application cannot go home, it can be configured to nonetheless shut itself down at the target device and/or go to a temporary server location, and optionally to self-destruct at the target device, so that the roaming application and/or roaming application information cannot be re-accessed from the target device.

Furthermore, the technology described herein may be utilized to enable roaming applications to roam to a wider number of devices than would otherwise be possible. As a wide variety of objects and devices incorporate increasing processing power, these objects and devices become potential target devices, capable of hosting roaming applications. However, while a wristwatch, camera, coffee maker, or other potential target device may be available to execute roaming applications, such device may include minimal to no user interface features to support user interaction with a roaming application after the application roams to the target device. By leveraging the technology disclosed herein, the need for target device UI features may be reduced or eliminated and the variety of target devices to which applications can roam increases. Conversely, as roaming applications proliferate, the described technology may create a broader range of options for device developers in terms of how to configure devices. The cost of developing UI features can be omitted for some devices, while device capabilities of otherwise executing roaming applications may be included.

In some examples, users of roaming applications may be concerned with security associated with data and other information that can potentially be compromised by allowing their applications to roam to target devices. The described technology may include a feature whereby, in the event that a user cannot control a roaming application from a target device, the user may nonetheless recover the roaming application. Furthermore, in some embodiments, roaming applications may be configured to "self destruct" or clean up roaming application code and data at the target device prior to returning to the home device. A roaming application may be configured to delete, scramble, or otherwise destroy roaming application code and data existing at the target device as a final step in roaming from the target device.

Returning to FIG. 1, in some embodiments, the roaming application 120 may include a roam manager 122 and return module 123 controlling roam and return of the application 120 to and from the home device 100. In embodiments wherein the roaming application 120 itself controls roam and return of the application 120, the home device 100 and target device 150 may or may not also include roam managers 111, 161 and return modules 112, 162.

In some embodiments, the roaming application 120 may be adapted to execute on the home device 100, for example through operation of application modules 121, optionally operating in conjunction with the operating system 110 and hardware 101. Application modules 121 may include any of an infinite number of potential functions and features. Application modules 121 may for example implement a game, a browser, a downloadable "App" for a smart phone or other computing device, and/or a productivity application such as those included in the MICROSOFT OFFICE® productivity suite. These application types or any other application type may be implemented via application modules 121. In the course of executing on the home device 100, the application modules 121 may interact with other applications that execute on the home device 100, with the operating system 110, with hardware 101, and/or with the user of the home device 100, for example, by receiving inputs and commands via the home device UI 102, and by producing output via a display, speakers, or other output device.

In some embodiments, the application 120 may be arranged to provide an interface for receiving roam commands from a user, operating system 110 or device hardware 101. Roam commands may be processed by the roam manager 122. The roam manager 122 may include modules configured to cause the roaming application 120 to roam between devices, such as, from the home device 100 to the target device 150. Functions of the roam manager 122 may include, for example, enforcing policies that a target device 150 may be of at least one accepted target device type. The roaming application 120 may be configured to be compatible with one or more known device types. Compatible device types may be enumerated in a list that is accessible by the roam manager 122 as the roaming application executes on the home device 100. The roam manager 122 may be configured to query a target device 150 for type information, prior to roaming to the target device 150. If the target device type information matches a device type from the list, the roam manager 122 may be configured to proceed with the roam operation. If the target device type information does not match a device type from the list, the roam manager 122 may be configured to prevent the roam operation from occurring, for example by throwing an error that notifies the user of the home device 100 that the target device type is not supported by the roaming application 120.

A roam operation performed by the roam manager 122 may, but need not, be performed during execution of the roaming application on the home device 100. The roam manager 122 may comprise one or more modules configured to transfer roaming application information, such as for example state information, application code, and application license information to the target device 150, and to cause the application 120 to execute on the target device 150 using the transferred application information. Similarly, the roam manager 122 may be configured to return the roaming application 120 from the target device 150 to the home device 100, during execution of the roaming application 120 on the target device 150, through transfer of roaming application information to the home device 100. Roam managers are discussed in further detail with reference to FIG. 3 and FIG. 4, below.

The roaming application 120 may further comprise one or more return modules 123 configured to automatically initiate the return of the roaming application 120 from the target device 150 to the home device 100 in response to a return event. A return event may be any event that the return module 123 is configured to respond to by initiating a return to the home device 100. A return event may be generated by a return module 123, detected by a return module 123, and/or provided to and received by the return module 123. Some examples of return events include a timer reaching a designated value, completion of a designated task, a return signal from the home device, and/or detection of a failure in the target device 150. A return module 123 may for example include one or more detect/generate return event module(s) configured to initiate a timer when the roaming application 120 roams from the home device 100 to the target device 150, to determine when a designated task is complete at the target device 150, to receive return information in a return signal at the target device 150 from the home device 100, and/or to detect a failure in the target device 150, the failure comprising one or more of: absence in the target device 150 of one or more enumerated features, and/or a failure by the target device 150 to perform one or more instructions associated with the roaming application 120. Example return modules are discussed in further detail with reference to FIG. 5 and FIG. 6, below.

In some embodiments, a roaming application 120 may include a module configured to override the return of the roaming application 120 from the target device 150 to the home device 100, in response to a user command. For example, the roaming application 120 may be configured to present a UI at a target device 150 display, notifying the user of the target device 150 that the roaming application 120 has experienced a return event and will return to the home device 100. The displayed UI may include a selectable return override control, allowing the user to override the return, thereby allowing the roaming application 120 to continue executing at the target device 150.

In some embodiments, a roaming application 120 may include a module configured to automatically initiate a roam by the roaming application 120 from the target device 150 to a server 170, in response to a detected failure to return to the home device 100. For example, prior to returning to the home device 100, the roam manager 122 may be configured to determine if link 190 is available. If the link 190 is available, then the roam manager 122 may be configured to proceed with a return operation, returning the roaming application 120 to the home device 100. If the link 190 is not available, then the roam manager 122 may be configured to determine if another communication link, e.g., link 171 is available, allowing the roam manager 122 to roam to server 170 via the internet. If the link 171 is available, then the roam manager 122 may be configured to cause roaming application 120 to roam to server 170 in lieu of returning to the home device 100. In some embodiments the application 120 may roam to the server 170 and continue executing on the server 170, and in some embodiments the roam manager 122 may save application information to the server 170, and then shut down and optionally self-destruct the application 120 at the target device 150. In either case, the application information and/or application 120 itself may subsequently return to the home device 100 when the home device is able to establish a link 172 to the server 170.

In some embodiments, the operating system 110 may include roam manager 111 and return module 112, which may be configured to cooperatively interact with roam manager 122 within roaming application 120 and/or roam manager 161 within the target device 150 to control roam of the application 120 from the home device 100 to the target device 150, and return of the roaming application 120 from the target device 150 to the home device 100. In embodiments wherein the operating system 110 controls roam and return of the application 120, the roaming application 120 and target device 150 may or may not also include roam managers 122, 161 and return modules 123, 162, however some embodiments may include a roam manager 122, 161 in at least one of the roaming application 120 and target device 150.

A home device 100 may be configured to provide an execution environment for a roaming application 120 on behalf of an owner of the roaming application 120. An owner of the roaming application 120 may be, for example, a person or company that owns, rents, leases, licenses, or otherwise controls the home device 100 and may be able to purchase, license, or otherwise acquire application software, such as the roaming application 120, and cause the software to run on the home device 100. The device 100 may be considered a "home device" because it provides a home-base for execution of the roaming application 120 on behalf of the user of the device 100. The term "home device" is not intended to imply that the device necessarily operates within a household structure. Instead, the term "home device" is used because the device 100 provides a "home" or primary execution environment for the roaming application 120. The home device 100 may be, for example a laptop or desktop computer, smart phone, or other computing device as discussed in connection with FIG. 2, regardless of whether such device is designed for personal, home, business, educational, experimental or other use.

A home device 100 may comprise a processor 104, a memory 105, and/or an operating system 110 loadable into the memory 105 and configured to execute on the processor 104. The operating system 110 may be configured to provide an execution environment for the roaming application 120.

The operating system 110 may be configured to transfer the roaming application 120 from the home device 100 to a target device 150, during execution of the roaming application 120 at the home device 100 and in response to a user command received at the home device 100, the transfer comprising transfer of roaming application information, such as state information and roaming application executable code from the home device to the target device. A user command received at the home device 100 may comprise for example a command received via a UI provided by the roaming application 120, and/or a command received via a UI provided by the operating system 110. The user command may indicate a desired target device 150 along with a command to roam to the target device 150.

The operating system 110 may be configured to initiate return of the roaming application 120 from the target device 150 to the home device 100, by sending a communication to the target device 150 in response to a return event. The return event received or generated by operating system 110 may comprise, for example, one or more of a user command, a timer reaching a designated value, and/or an interruption or degradation of signal quality on a communication channel 190 used by the home device 100 to communicate with the target device 150.

In some embodiments, a communication from the operating system 110 to the target device 150 may comprise a message, such as one or more IP packets including message data in packet payload(s). In some embodiments, an operating system 110 communication to the target device 150 may comprise a Remote Procedure Call (RPC) to a target device 150 interface, such as an interface provided by communication device 153 and/or operating system 160.

In some embodiments, the communication to the target device 150 may be configured for processing by the target device 150. The communication may instruct the target device operating system 160 to return the roaming application 120 to the home device 100. The target device operating system 160 can be configured to manage the return of the roaming application 120 to the home device 100, in response to the communication from the home device operating system 110. When the target device operating system 160 is configured to return the roaming application 120 to the home device 100, the communication need not necessarily be passed to the roaming application 120.

In some embodiments, the communication to the target device 150 may be configured for processing by the roaming application 120. The communication to the target device 150 may include an instruction to the roaming application 120 to return to the home device 100. The target device 150 may be configured to pass the communication to the roaming application 120, and the roaming application 120 may be configured to respond to the communication by initiating return to the home device 100.

In some embodiments, the operating system 110 may comprise instructions to retrieve the roaming application 120 from a server 170, in response to a failure of the roaming application 120 to return to the home device 100.

A target device 150 may be configured to provide an execution environment for a roaming application 120, and configured to return the roaming application 120 to a home device 100 associated with an owner of the roaming application 120. The target device 150 may comprise a processor 154, a memory 155, and/or an operating system 160 loadable into the memory 155 and configured to execute on the processor 154.

The operating system 160 may be configured to provide an execution environment for the roaming application 120, and the operating system 160 may be configured to transfer the roaming application 120 from the target device 150 to the home device 100, optionally during execution of the roaming application 120. As with the initial transfer to the target device 150, the transfer from the target device 150 to the home device 100 may comprise transfer of roaming application information, such as state information and roaming application executable code to the home device 100.

In some embodiments, the operating system 160 may be configured to initiate return of the roaming application 120 from the target device 150 to the home device 100 in response to a return event. The return event may comprise for example one or more of an automatically initiated return command from the roaming application 120, a timer reaching a designated value, an interruption or degradation of signal quality on a communication channel 190 used by the home device 100 to communicate with the target device 150, completion of a designated task, a return signal from the home device 100, and/or a detected failure in the target device 150. A target device 150 may be configured with an interface accessible via the communications device 153, where the interface is configured to process received instructions to return the roaming application 120 to the home device 100.

In some embodiments, the operating system 160 may comprise instructions to automatically transfer the roaming application 120 from the target device 150 to a server 170, in response to a failure to return the roaming application 120 to the home device 100.

Figure 2:
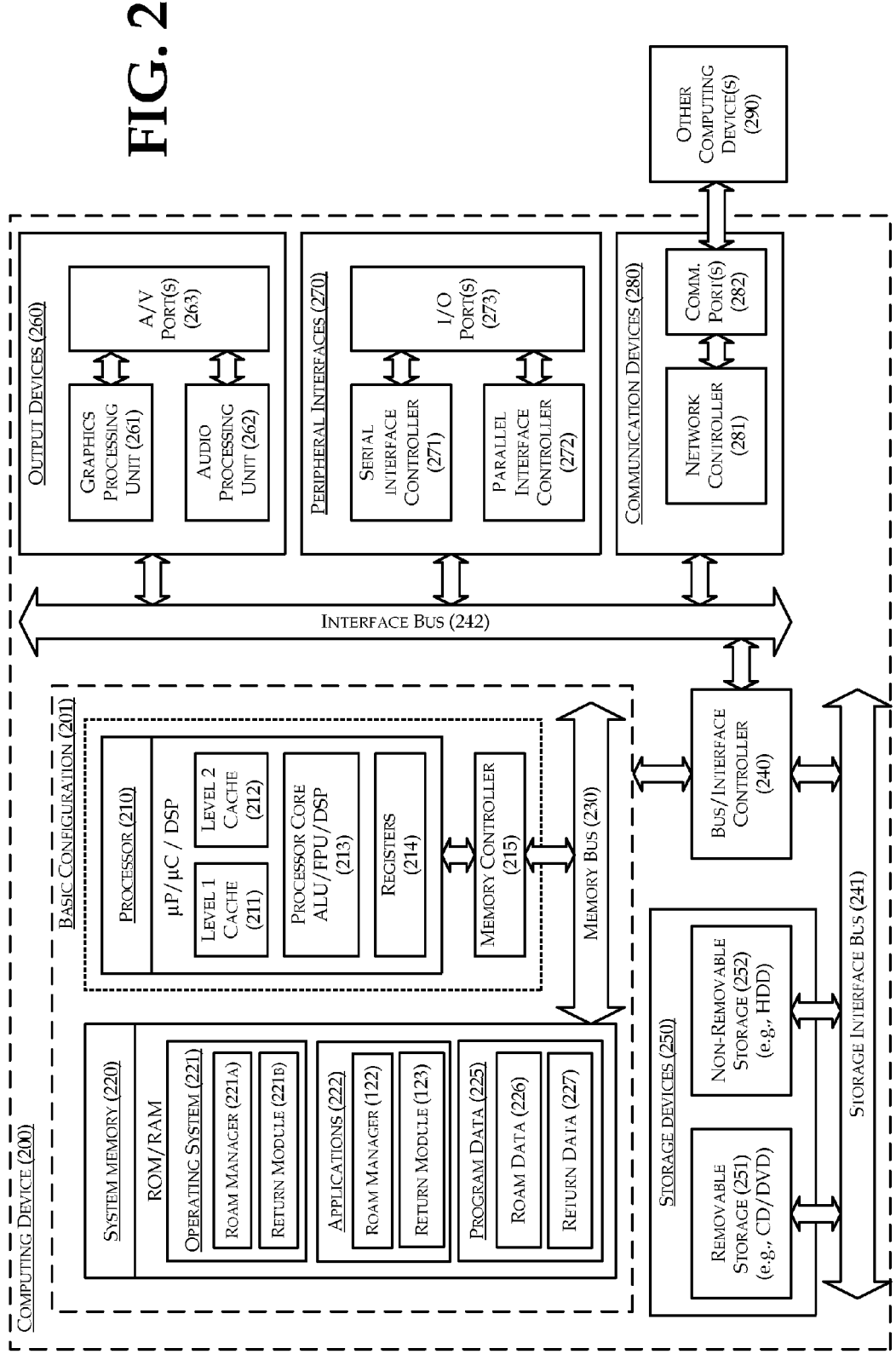
FIG. 2 is a block diagram illustrating a computing device as one example of a home and/or target device.

FIG. 2 is a block diagram of a computing device 200 as one example of a home device 100 and/or target device 150, arranged in accordance with at least some embodiments of the present disclosure. In a very basic configuration 201, computing device 200 may include one or more processors 210 and system memory 220. A memory bus 230 may be used for communicating between the processor 210 and the system memory 220.

Depending on the desired configuration, processor 210 may be of any type including but not limited to a microprocessor (µP), a microcontroller (µC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. Operating system 221 may include, for example, one or more roam manager module(s) 221A and return module(s) 221B. The module(s) 221A and 221B may be configured to serve as home device modules such as 111 and 112, as discussed with reference to FIG. 1, and/or as target device modules such as 161 and 162, as discussed with reference to FIG. 1.

Applications 222 may include, for example, one or more roaming applications comprising roam manager module(s) 122 and return module(s) 123 as illustrated in FIG. 1. Program data 225 may include roam data 226 and return data 227 that may be used by modules 221A, 221B, 122, and/or 123. It will be appreciated with the benefit of this disclosure that the features of the home device and target device operating systems, roaming application, roam managers and return modules disclosed herein may be rearranged and combined in a large variety of different ways. This disclosure contemplates the possibility of moving any of the disclosed features into any of described software elements, as may be necessary or convenient for particular embodiments.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of computing device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as any device type, including for example, a smart phone, a laptop or desktop computer, a server computer, a tabletop or other display, a television, a stereo system, an on-board vehicle computer, a thermostat, a building security system, a building automation system, an appliance such as a refrigerator, coffee maker, microwave, and/or stovetop, a small-form factor portable (or mobile) electronic device such as a cell phone, personal data assistant (PDA), personal media player device, wireless webwatch device, and/or personal headset device, an application-specific device, and/or a hybrid device that may include any of the above functions.

Figure 3:
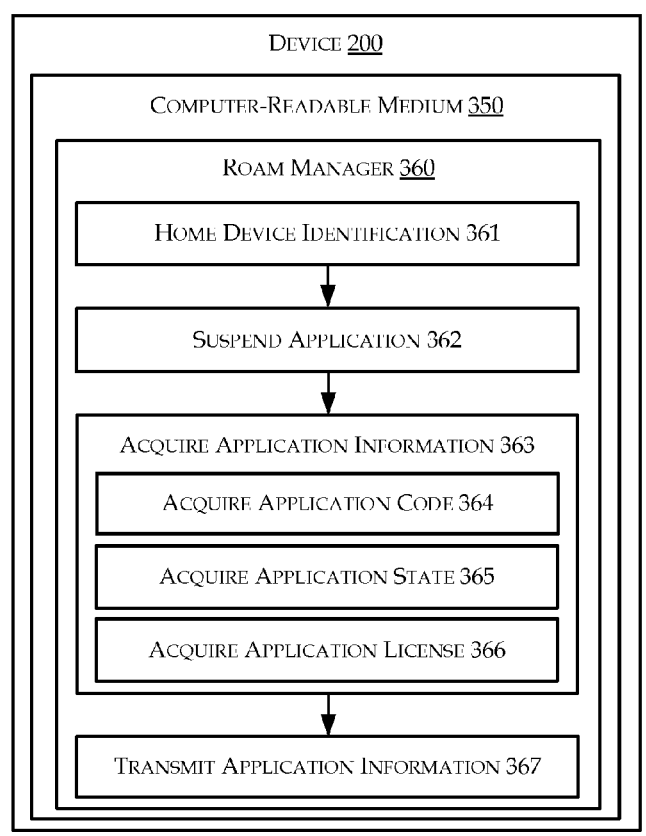
FIG. 3 is a block diagram illustrating an example roam manager.

FIG. 3 is a block diagram illustrating an example roam manager, arranged in accordance with at least some embodiments of the present disclosure. The example roam manager 360 may include one or more operations/modules as illustrated by blocks 361-367, which represent operations as may be performed in a method, functional modules in a device 200, and/or instructions as may be recorded on a computer readable medium 350. The illustrated blocks 361-367 may be arranged to provide functional operations including one or more of "Home Device Identification" at block 361, "Suspend Application" at block 362, "Acquire Application Information" at block 363, and/or "Transmit Application Information" at block 367. Block 363 may include "Acquire Application Code" at block 364, "Acquire Application State" at block 365, and/or "Acquire Application License" at block 366.

In FIG. 3, blocks 361-367 are illustrated as being performed sequentially, with block 361 first and block 367 last. It will be appreciated that blocks 361-367 may be re-ordered as convenient to suit particular embodiments, and that these blocks or portions thereof may be performed concurrently in some embodiments. It will also be appreciated that in some examples various blocks may be eliminated, divided into additional blocks, and/or combined with other blocks.

The example roam manager 360 may correspond to a roam manager within a roaming application 120, such as roam manager 122, or a roam manager such as 111, 161, and/or 221A. In general, a roam manager 360 may oversee roaming operations, whether a roaming application 120 is roaming from a home device 100 to a target device 150, between different target devices, from a target device 150 to a server 170, from a server 170 to a home device 100, and/or from a target device 150 to a home device 100.

In a "Home Device Identification" block 361, the roam manager 360 may be configured to identify a home device. The roam manager 360 may be configured to query the home device 100 and/or operating system 110 for a home device identifier, and may be configured to store the returned home device identifier. Any identifier may be used, for example, an Internet Protocol (IP) address, a Global Unique Identifier (GUID) for the home device 100 and/or operating system 110, and/or a user-assigned identifier. The roam manager 360 may be configured to subsequently use the home device identifier in situations wherein the roaming application 120 attempts to return from a target device 150 to the home device 100, as discussed in further detail herein. Block 361 may be followed by block 362.

In a "Suspend Application" block 362, the roam manager 360 may be configured to suspend further execution of the roaming application 120 in preparation for roaming from a host device, which provides a present execution environment for the roaming application 120, to a roam target, which provides a desired next execution environment for the roaming application 120. In some embodiments, suspending a roaming application may comprise pausing the application, without fully closing or exiting from the application. In some embodiments, suspending a roaming application may comprise fully stopping the application. In some embodiments, suspending a roaming application may comprise stopping the roaming application in addition to disabling the application from further execution at the host device. For example, an application license key may be made unavailable or inoperable.

Depending on the circumstances of where a roaming application 120 is presently executing, a home device 100 may be a host device or a roam target, and a target device 150 may also be a host device or a roam target. The roam manager 360 may be configured to suspend the roaming application 120 on the host device, for example, in response to a UI command to roam to a roam target. The roam manager 360 may be configured to suspend the roaming application by inserting a suspend command in the execution path of the roaming application 120, and/or through a request to a host device operating system. Block 362 may be followed by block 363.

In a "Acquire Application Information" block 363, any information needed to allow the application 120 to roam to a roam target, resume executing at the roam target, and return to the home device, if applicable, may be gathered and stored into a data structure for transmission to the roam target. Examples of acquiring application information 363 include acquiring application code 364, acquiring application state 365, and acquiring application license 366. Block 363 may include blocks 364, 365, and 366.

In a "Acquire Application Code" block 364, the roam manager 360 may be configured to load application code into a data structure, such as a code file in active device memory. Application code may include computer readable instructions and data structures corresponding to the roaming application 120, including for example one or more of code that is in an execution path of a host device processor, code loaded into a host device memory, and/or application code stored on a disk or other non-volatile memory accessible by the host device. In some embodiments, when the host device is any device other than the home device 100, the roam manager 360 may be configured to delete any application code for the roaming application 120 that is not stored in the code file(s) in preparation for roaming. Block 364 may be followed by block 365.

In a "Acquire Application State" block 365, the roam manager 360 may be configured to store application state information in a data structure, such as a roaming application state file in active device memory of a host device. Application state information may comprise any information allowing the roaming application 120 to enter a same or substantially similar state, after arriving at a roam target, as the state of the application in the host device at the time the application was paused. For example, any active UI, session history, open files, and queued operations may be stored as application state information. Block 365 may be followed by block 366.

In a "Acquire Application License" block 366, the roam manager 360 may be configured to store application license information in a data structure, such as a roaming application license file in active device memory of a host device. The license may comprise a license or license key granting the roam target any desired level of application use rights. The roam target may be provided with a full license or limited license. Limited licenses may limit roaming application functions and/or application usage intervals. Block 366 may be followed by block 367.

In a "Transmit Application Information" block 367, the roam manager 360 may be configured to initiate transmission of application state file(s) and/or other data structures and code file(s) and/or other data structures from the host device to the roam target. The roam manager 360 may be configured to command host device hardware and/or a host device operating system or subcomponents thereof to transmit the application state file(s) and code file(s) to an identified roam target. In the case of a roam that is initiated by a user, the roam manager 360 may be configured to receive roam target identification information for example via a UI interaction with a user. In the case of a roam that is initiated by a return module, the roam manager 360 may be configured to receive roam target identification information for example from the return module.

Figure 4:
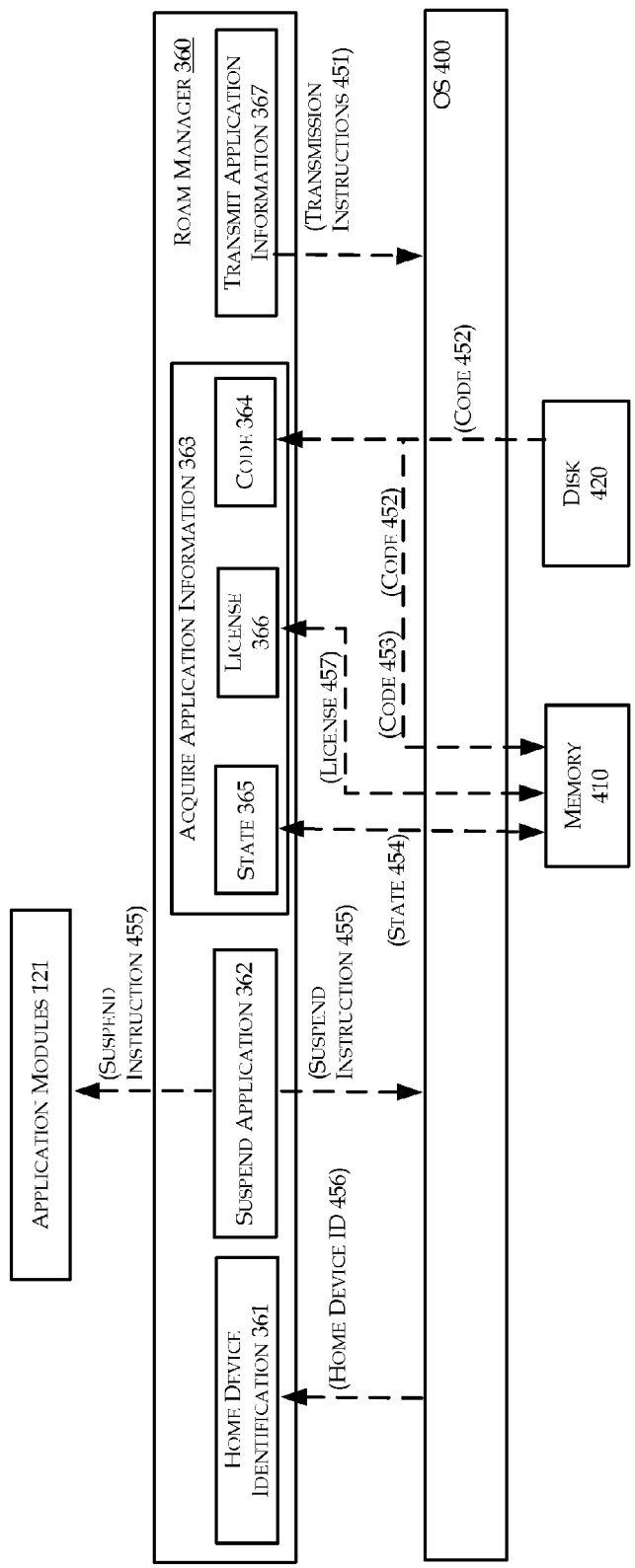
FIG. 4 is a schematic diagram illustrating example operations of a roam manager.

FIG. 4 is a schematic diagram illustrating example operations of a roam manager 360, arranged in accordance with at least some embodiments of the present disclosure. FIG. 4 includes a roam manager 360 comprising blocks 361-367 as illustrated in FIG. 3. Additionally, FIG. 4 provides an operating system 400, memory 410, disk 420, and application modules 121.

In FIG. 4, a Home Device ID 456 is illustrated as passing from the OS 400 to the "Home Device Identification" block 361. A Suspend Instruction 455 is illustrated as passing from the "Suspend Application" block 362 to one or more of the OS 400 and/or the application modules 121. An "Acquire Application Information" block 363 includes a variety of example blocks 364-366 configured to acquire application information as discussed in connection with FIG. 3. State information 454 is illustrated as passing between the "Acquire Application State" block 365 and memory 410, via OS 400. State information 454 may be stored in one or more application information file(s) in memory 410. Code 453 is illustrated as passing between the "Acquire Application Code" block 364 and memory 410, via OS 400. Code 452 is illustrated as passing from disk 420 to the "Acquire Application Code" block 364, and from the "Acquire Application Code" block 364 to memory 410, via OS 400. Code 452 and 453 may be stored in one or more application information file(s) in memory 410. License information 457 is illustrated as passing between the "Acquire Application License" block 366 and memory 410, via OS 400. License information 457 may also be stored in one or more application information file(s) in memory 410. Transmission Instructions 451 are illustrated as passing from the "Transmit Application Information" block 367 to the OS 400.

Much of FIG. 4 may be understood by reference to the various blocks described with reference to FIG. 3. It should be noted that the roam manager 360 may in some embodiments be included in a roaming application 120 along with application modules 121, and may in some embodiments be included in operating system 400.

In FIG. 4, memory 410 may initially include application state information 454. After suspending the application modules 121, the "Acquire Application State" block 365 may be configured to gather and consolidate the state information 454 in one or more application state file(s), which may be stored back in the memory 410 in one or more application information file(s) for transmission pursuant to a roam operation. Similarly, memory 410 may include code 453 as well as other application data and application license information 457, while disk 420 may include additional code 452, application data, and optionally application license information 457 as well. The "Acquire Application Code" block 364 may gather and consolidate the code 452, 453 and application data in one or more code file(s), which may be stored back in the memory 410 in one or more application information file(s) for transmission pursuant to a roam operation. The "Acquire Application License" block 366 may gather and/or generate a roam license 457 from memory 410 or disk 420 (gathering from disk not shown) for use at the roam target, and may store license information in the memory 410 in one or more application information file(s) for transmission pursuant to a roam operation. Transmission instructions 451 may indicate a roam target to the operating system 400, so that the application information file(s) in memory 410 may be transmitted to the roam target. The roam manager 360 may also be configured to launch the roaming application 120 upon arrival of the application information file(s) at the roam target.

Figure 5:
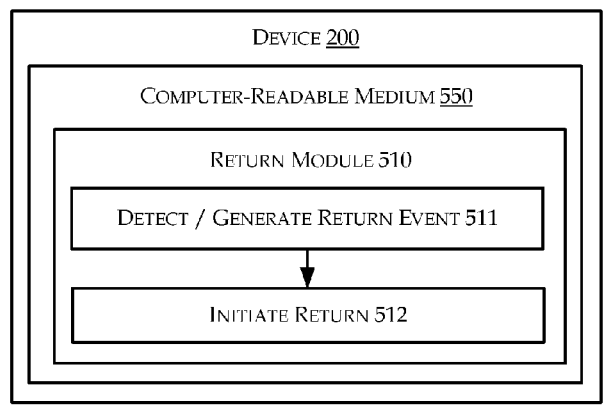
FIG. 5 is a block diagram illustrating an example return module.

FIG. 5 is a block diagram illustrating an example return module, arranged in accordance with at least some embodiments of the present disclosure. The example return module may include one or more operations/modules as illustrated by blocks 511-512, which represent operations as may be performed in a method, functional modules in a device 200, and/or instructions as may be recorded on a computer readable medium 550. The illustrated blocks 511-512 may be arranged to provide functional operations including one or more of "Detect/Generate Return Event" at block 511, and/or "Initiate Return" at block 512.

In FIG. 5, blocks 511-512 are illustrated as being performed sequentially, with block 511 first and block 512 last. It will be appreciated that blocks 511-512 may be re-ordered as convenient to suit particular embodiments, and that these blocks or portions thereof may be performed concurrently in some embodiments. It will also be appreciated that in some examples various blocks may be eliminated, divided into additional blocks, and/or combined with other blocks.

The example return module 510 may correspond to a return module within a roaming application, such as return module 123, or a return module such as 112, 162, and/or 221B. In general, a return module 510 may initiate a return of a roaming application to a home device. The return module 510 may initiate such return in response to a return event. The return module 510 may be configured according to whether it is incorporated into a roaming application, such as return module 123 in FIG. 1, whether it is incorporated into a home device operating system 110 such as return module 112 in FIG. 1, or whether it is incorporated into a target device operating system 160 such as return module 112 in FIG. 1.

In some embodiments, return module 510 may be configured to load after a roam operation. When a return module 510 incorporated into a roaming application, such as return module 123 in FIG. 1, the return module 510 may be configured to first determine whether the host device is also the home device 100, for example by checking the home device identifier. If the host device is also the home device 100, the return module 510 may be configured to exit, it is not needed. If the host device is a target device 150, the return module 510 may be configured to load the "Detect/Generate Return Event" module 511.

In a "Detect/Generate Return Event" block 511, return module 510 may be configured to detect and/or generate a return event. When a return module 510 incorporated into a roaming application, such as return module 123 in FIG. 1, a return module 510 may be configured to detect and/or generate a return event for example by checking one or more parameters of a target device 150 as the roaming application 120 executes thereon, by receiving a return event, such as by receiving a notification from an application module 121 or target device operating system 160, and/or by generating a return event, for example by setting a timer, wherein the timer reaching a predefined value is defined as a return event. In this regard, return module 510 may include for example, a module configured to initiate a timer when the roaming application 120 roams from the home device 100 to the target device 150, a module configured to determine when a designated task is complete at the target device 150, a module configured to receive return information in a return signal at the target device 150 from the home device 100, and a module configured to detect a failure in the target device 150, the failure comprising one or more of: absence in the target device 150 of one or more enumerated features, and/or a failure by the target device 150 to perform one or more instructions associated with the roaming application 120.

In some embodiments, a module configured to determine when a designated task is complete at the target device 150 may for example be configured to receive a return event from an application module 121, when the application module completes a task. The return module 510 may be configured to initiate return of the roaming application 120 to the home device 100 after completion of a task.

In some embodiments, a module configured to receive return information in a return signal at the target device 150 from the home device 100 may for example be configured to receive a return information generated by the home device 100, and sent to the target device 150, where the return information is then passed to the return module 510. The return instructions may for example indicate a user command to return, a user command not to return, and/or a user command to roam to a different target device.

In some embodiments, a module configured to detect a failure in the target device 150 may for example be configured to receive a failure notification from an application module 121, when the application module 121 fails to complete a task. The failure may comprise, for example, one or more of absence in the target device 150 of one or more enumerated features and/or a failure by the target device 150 to perform one or more instructions associated with the roaming application 120. The return module 510 may be configured to initiate return of the roaming application 120 to the home device 100 when it is discovered that the target device 150 may not be capable of completing desired tasks.

In embodiments in which the return module 510 is incorporated into a home device operating system 110 and/or target device operating system 160, the return module 510 may be configured to load the "Detect/Generate Return Event" module 511 when a roaming application 120 roams from home device 100 to the target device 150. The "Detect/Generate Return Event" block 511 may be followed by the "Initiate Return" block 512, in which the return module 510 is configured to initiate return of the roaming application 120 to the home device 100, for example by commanding a roam manager to return the roaming application 120 to the home device 100.

In embodiments in which the return module 510 is incorporated into a home device operating system 110, a return module 510 may be configured to detect and/or generate a return event for example by receiving a user command, a timer reaching a designated value, and/or an interruption or degradation of signal quality on a communication channel used by the home device to communicate with the target device.

In some embodiments, a user command may comprise a command received via an operating system 110 user interface feature configured to initiate return of the roaming application 120 from the target device 150. For example, the user of a home device may initially cause a roaming application 120 to roam to a desired target device 150. The user may subsequently recall the roaming application 120 from the target device 150, using the UI available to the user at the home device 100. The home device operating system 110 may provide UI configured to allow the user to recall the roaming application 120. The UI may be configured to produce a user-generated return event that is passed to the return module 510. The return module 510 may be configured to send return information to the target device 150, instructing the target device operating system 160 and/or roaming application 120 to return to the home device 100.

In embodiments in which the return module 510 is incorporated into a home device operating system 110, a timer may comprise a timer initiated by the operating system 110 when the roaming application 120 roams away from the home device 100. The return module 510 may be configured to generate a return event when the timer reaches a predetermined value. The return module 510 may be configured to initiate return by sending return information to the target device 150, instructing the target device operating system 160 and/or roaming application 120 to return to the home device 100.

In embodiments in which the return module 510 is incorporated into a home device operating system 110, the interruption or degradation of communication channel signal quality may comprise a degradation of communication channel signal quality due to a wireless range between the home device 100 and the target device 150. The return module 510 may be configured to monitor signal quality of link 190. The return module 510 may be configured to initiate return in response to signal quality dropping below a predetermined signal strength. As with the above-described return events, the return module 510 may be configured to initiate return by sending return information to the target device 150, instructing the target device operating system 160 and/or roaming application 120 to return to the home device 100.

In embodiments in which the return module 510 is incorporated into a target device operating system 160, a return module 510 may be configured to detect and/or generate a return event for example by receiving an automatically initiated return command from the roaming application 120, a timer reaching a designated value, detecting an interruption or degradation of signal quality on a communication channel used by the home device to communicate with the target device, detecting completion of a designated task, receiving a return signal from the home device, and/or detecting a failure in the target device. The various operations involved are described herein with respect to return modules incorporated into a roaming application 120 and home device operating system 110. It will be understood that corresponding structures and methods may be included in a target device operating system 160.

In some embodiments, it should be noted that a return module 510 may be configured to cause a roaming application to roam to a device other than the home device 100. For example, the home device 100 may instruct the return module 510 to cause the roaming application to roam from a first target device to a second target device. The return module may pass this information to the roam manager, and initiate a roam operation, causing the roaming application to roam to the second target device.

Figure 6:
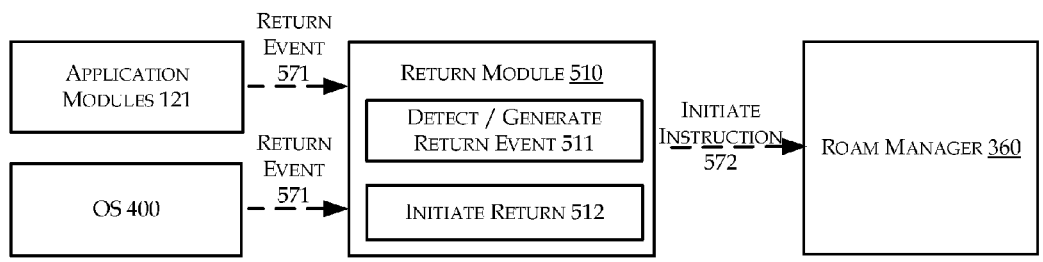
FIG. 6 is a schematic diagram illustrating example operations of a return module.

FIG. 6 is a schematic diagram illustrating example operations of a return module 510, arranged in accordance with at least some embodiments of the present disclosure. FIG. 6 includes a return module 510 comprising blocks 511-512 as illustrated in FIG. 5. Additionally, FIG. 6 provides application modules 121, OS 400, and roam manager 360.

In FIG. 6, a return event 571 is illustrated as passing from the application modules 121 to the return module 510. A return event 571 is illustrated as also passing from the OS 400 to the return module 510. An initiate instruction 572 is illustrated as passing from the return module 510 to the roam manager 360.

Much of FIG. 6 may be understood by reference to the various blocks described with reference to FIG. 5. FIG. 6 is included herein to depict the return module 510 receiving return events 571 from application modules 121 and/or an operating system 400. The return module 510 may also generate a return event using the detect/generate return event module 511 as discussed herein. Upon detecting and/or generating a return event, the initiate return module 512 may send initiate instruction 572 to the roam manager 360. The initiate instruction may comprise an instruction to roam to a roam target, and an identifier for the roam target. In some embodiments, the roam target may comprise the home device 100 identified by the home device identifier discussed herein. In some embodiments, the return module 510, roaming application 120, and/or or operating systems 110, 160, may also comprise instructions configured to launch the return module 510 and/or aspects thereof when a roaming application engages in a roaming operation.

Figure 7A:
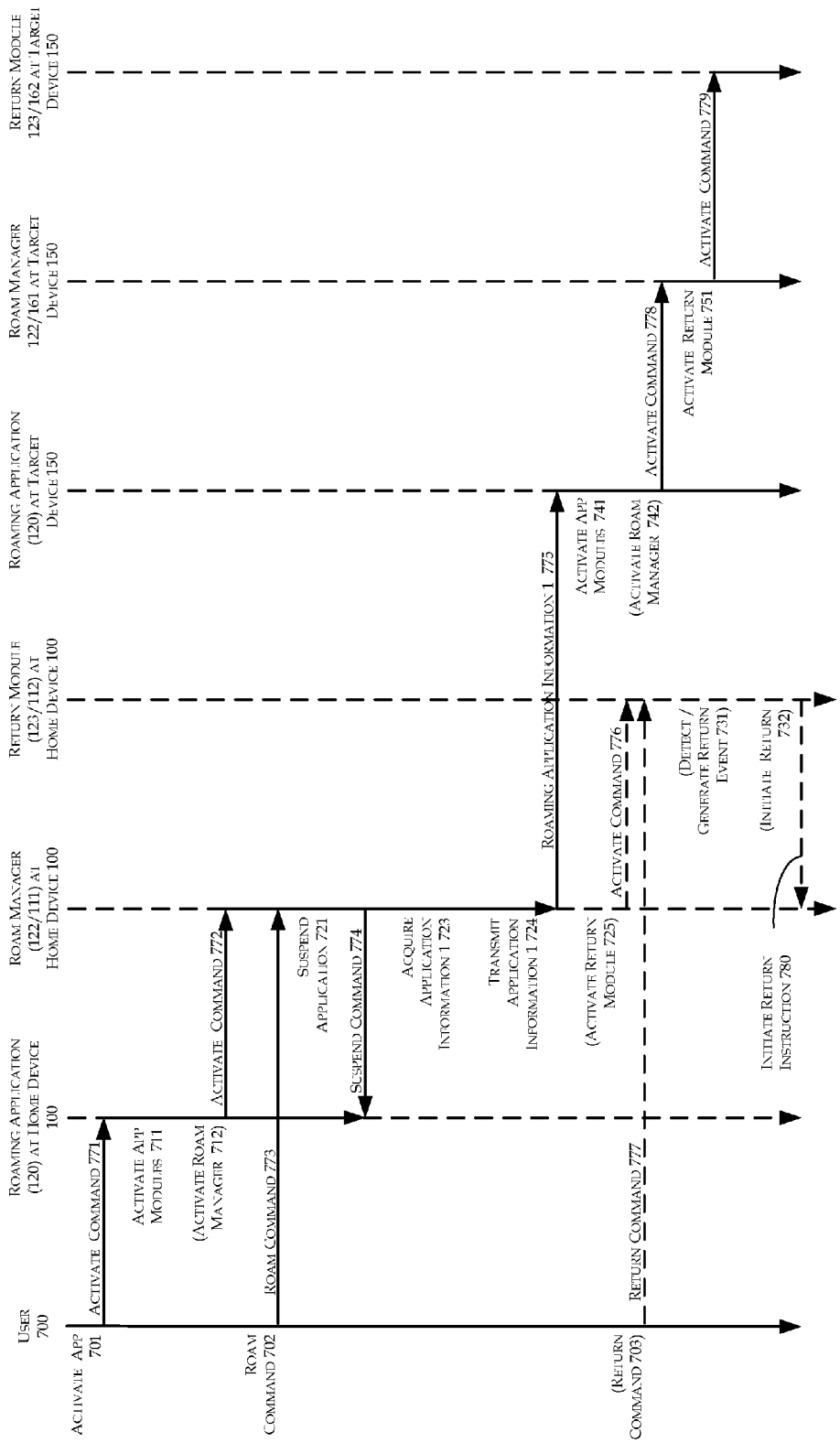
FIG. 7A and FIG. 7B, is a diagram illustrating example operations and interactions of a user, roaming application, roam manager(s), and return module(s) as they interact with a home device and target device, all arranged in accordance with at least some embodiments of the present disclosure.
Figure 7B:
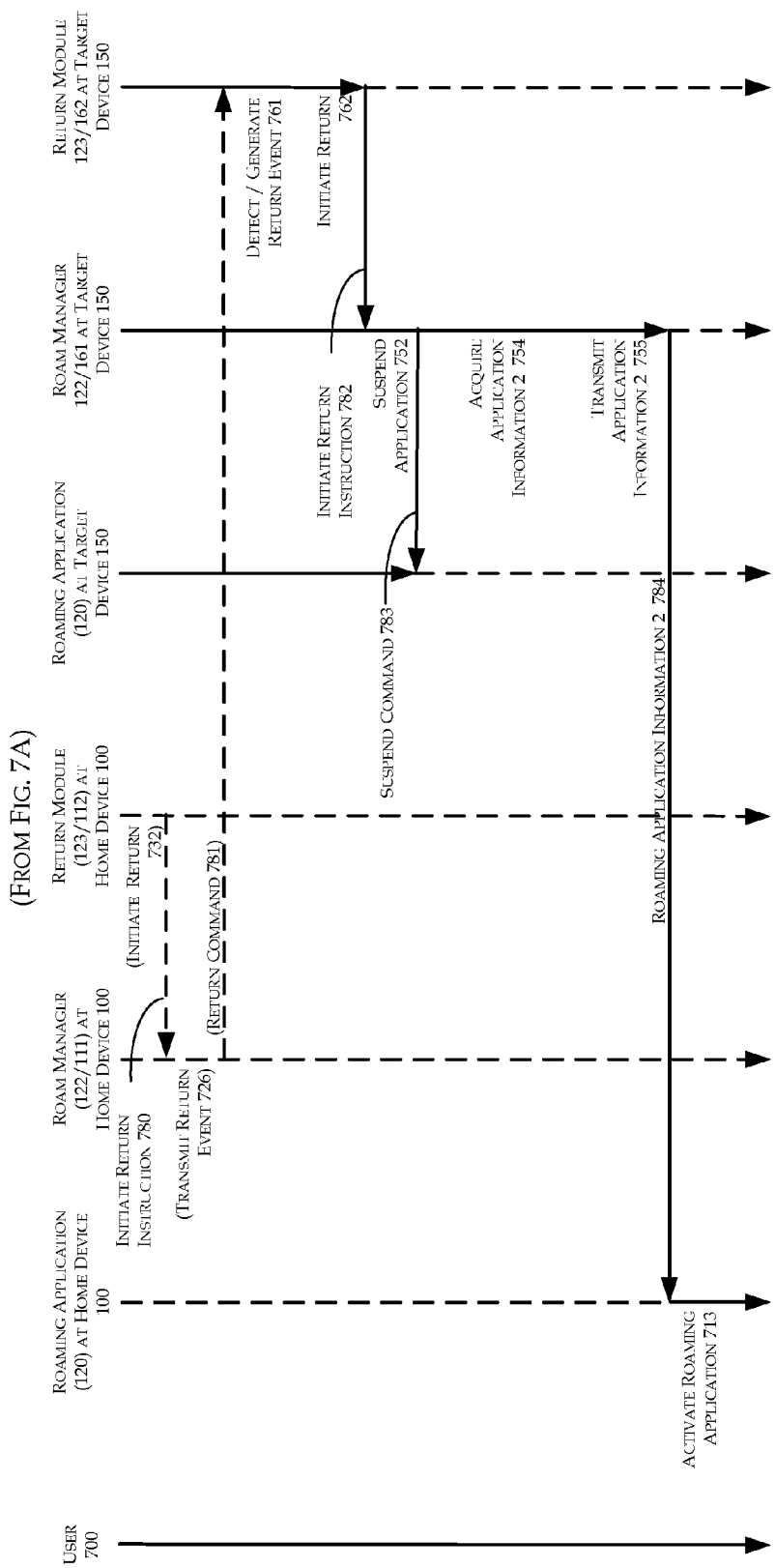

FIG. 7, including FIG. 7A and FIG. 7B, is a diagram illustrating example operations and interactions of a user, roaming application, roam manager(s), and return module(s) as they interact with a home device and target device. FIG. 7 includes a line representing a user 700, a roaming application 120 as it executes at a home device 100, a roam manager 122 or 111 as it executes at a home device 100, a return module 123 or 112 as it executes at a home device 100, a roaming application 120 as it executes at a target device 150, a roam manager 122 or 161 as it executes at a target device 150, and a return module 123 or 162 as it executes at a target device 150. Operations of each of the above are illustrated through a time interval including a roam from the home device 100 to a target device 150, and a return from the target device 150 to the home device 100.

With reference to FIG. 7A, user 700 may activate the roaming application 120 at a home device 100 in operation 701. For example, the user 700 may provide an activate command 771 to the roaming application 120 via a home device UI 102 and/or home device operating system 110. The roaming application 120 may be configured to respond to the activate command 771 by activating roaming application modules in operation 711.

The roaming application 120 may be configured to execute at the home device 100, performing application functions and interacting with the user 700 pursuant to the features and functions for which the application 120 and modules thereof are designed. In some embodiments, the roaming application 120 may be configured to perform operation 712 to issue an activate command 772 to activate a roam manager 122 at the home device 100. In some embodiments, a roam manager 111 may be a part of the home device OS, and the home device OS may be configured to activate roam manager 111.

The user may perform operation 702 to provide a roam command 773 to the roam manager 122 or 111. The roam command 773 may be provided to the roam manager 122 or 111 via a home device OS UI, home device hardware UI, and/or roaming application UI. In response to the roam command 773, the roam manager 122 or 111 may be configured to suspend the roaming application in operation 721, for example by issuing suspend command 774 to the roaming application 120. Suspend commands such as 774 may also be provided via a home device OS or home device hardware instructions. The roam manager 122 or 111 may also be configured to acquire application information 1 in operation 723. Application information 1 may comprise, for example, roaming application state information, data, code, and/or license information as described herein, as acquired at the home device 100. The roam manager 122 or 111 may be configured to transmit application information 1 in operation 724, for example by sending roaming application information 1 775 to the target device 150.

The target device OS and/or roaming application 120 may be configured to activate the roaming application modules at the target device 150 in operation 741. The roaming application 120 may be configured to execute at the target device 150, performing application functions and interacting with the user 700 pursuant to the features and functions for which the application 120 and modules thereof are designed. In some embodiments, the roaming application 120 may be configured to perform operation 742 to issue an activate command 778 to activate a roam manager 122 at the target device 150. In some embodiments, a roam manager 161 may be a part of the target device OS, and may be activated by the target device OS. The roam manager 122 or 161 may be configured to activate a return module 123 or 162 at the target device 150 in operation 751, which may for example send activate command 779 to the return module 123 or 162.

The roam manager 122 or 111 at the home device 100 may optionally also be configured to activate a return module 112 at the home device 100, in operation 725, for example by sending activate command 776 to the return module 112. In such embodiments, the return module 112 at the home device 100 may optionally be configured to detect and/or generate a return event at operation 731, while the roaming application 120 executes at the target device 150. For example, a user may provide a return command 703 to the home device, which may issue return command 777 to the return module 112 at the home device 100. In response to return command 777, the return module 112 at the home device 100 may be configured to initiate return of the roaming application in operation 732, by providing an initiate return instruction 780 to the roam manager 111. Turning to FIG. 7B, the roam manager 111 may be configured to respond to the initiate return instruction 780 by performing a transmit return event operation 726, transmitting return command 781 to the return module 123 or 162 at the target device 150.

The return module 123 or 162 at the target device 150 may be configured to detect and/or generate a return event in operation 761. In some embodiments, the return event may comprise return command 781 received from the home device 100. However, the return event that is generated and/or detected in operation 761 may comprise any number of other return events, examples of which are described herein. In response to the generated and/or detected return event, the return module 123 or 162 at the target device 150 may be configured to initiate return of the roaming application in operation 762, for example by sending an initiate return instruction 782 to the roam manager 122 or 161 at the target device 150.

The roam manager 122 or 161 at the target device 150 may be configured to respond to the initiate return instruction 782 by suspending the roaming application in operation 752, for example by issuing a suspend command 783 to the roaming application 120 executing at the target device 150. Suspend commands such as 783 may also be provided via a target device OS or target device hardware instructions. The roam manager 122 or 161 may also be configured to acquire application information 2 in operation 754. Application information 2 may comprise, for example, roaming application state information, data, code, and/or license information as described herein, as acquired at the target device 150. The roam manager 122 or 161 may be configured to transmit application information 2 in operation 755, for example by sending roaming application information 2 784 to the home device 100.

The home device OS and/or roaming application 120 may be configured to activate the roaming application modules at the home device 100 in operation 713. The roaming application 120 may execute at the home device 100, performing application functions and interacting with the user 700 pursuant to the features and functions for which the application 120 and modules thereof are designed.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A non-transitory computer readable medium having computer executable instructions configured to automatically initiate a return of a roaming application from a target device to a home device, wherein the home device provides an execution environment for the roaming application on behalf of an owner of the roaming application, wherein the instructions comprise:
   one or more roaming application modules configured to execute on the home device;
   one or more roam manager modules configured to manage a roam of the roaming application from the home device to a target device of at least one target device type, through transfer of one or more of roaming application state information and roaming application executable code to the target device;
   wherein the one or more roaming application modules are configured to execute on the target device of at least one target device type, using one or more of the roaming application executable code and application state information received at the target device from the home device;
   wherein the roam manager modules are configured to manage a return of the roaming application from the target device to the home device, through transfer of one or more of roaming application state information and roaming application executable code to the home device;
   one or more return modules configured to automatically initiate the return of the roaming application from the target device to the home device, through transfer of one or more of roaming application state information and roaming application executable code from the target device to the home device, in response to a return event, the return event comprising one or more of:
   detection of a return signal from the home device; and/or
   detection of a failure at the target device; and
   at least one module configured to:
     determine whether a communication link between the target device and the home device is available, wherein:
       when the communication link is available, the roam manager modules may proceed to manage the return of the roaming application from the target device to the home device in response to the return event; and
       when the communication link is not available, the at least one module is configured to determine whether a communication link between the target device and a server is available; and
     automatically initiate a roam by the roaming application from the target device to the server, instead of the return of the roaming application from the target device to the home device, when the communication link between the target device and the home device is not available and the communication link between the target device and the server is available.

2. The non-transitory computer readable medium of claim 1, wherein the one or more return modules are configured to automatically initiate the return of the roaming application from the target device to the home device, through transfer of one or more of roaming application state information and roaming application executable code from the target device to the home device, in response to a return event comprising completion of a designated task at the target device, wherein the return event is provided by the one or more roaming application modules to the one or more return modules in order for the one or more return modules to determine when the designated task is complete.

3. The non-transitory computer readable medium of claim 1, wherein the instructions comprise a module configured to receive return information in the return signal from the home device, the return information comprising a user command generated at the home device.

4. The non-transitory computer readable medium of claim 1, wherein the instructions comprise a module configured to detect the failure at the target device during execution of the one or more roaming application modules at the target device, and to automatically initiate the return of the roaming application from the target device to the home device responsive to detection of the failure, the failure comprising one or more of: absence of one or more enumerated features at the target device, and/or a failure to perform one or more instructions associated with the roaming application at the target device.

5. The non-transitory computer readable medium of claim 1, wherein the instructions comprise a module configured to override the return of the roaming application from the target device to the home device, in response to a user command, wherein the module configured to override the return of the roaming application from the target device to the home device is configured to present a User Interface (UI) at the target device, wherein the UI notifies a user at the target device of the return event, and wherein the UI includes a user selectable return override control to allow the one or more roaming application modules to continue executing at the target device.

6. A home device configured to provide an execution environment for a roaming application on behalf of an owner of the roaming application, the home device comprising:
a processor;
a memory;
an operating system loadable into the memory and configured to execute on the processor, wherein the operating system is configured to:
manage an execution environment for the roaming application;
transfer the roaming application from the home device to a target device in response to a user command received at the home device, the transfer comprising:
transfer of one or more of roaming application state information and roaming application executable code from the home device to the target device; and
wherein the target device and the home device are separate devices, each comprising its own respective processor and memory, and wherein the target device and the home device communicate via a communication link between the target device and the home device, at least a portion of which communication link is external to the target device and the home device;
wherein the operating system is configured to initiate return of the roaming application from the target device to the home device, through transfer of one or more of roaming application state information and roaming application executable code from the target device to the home device, by initiating a communication to the target device in response to a return event, the return event comprising one or more of:
detection of a user initiated command; and/or
an interruption or degradation of signal quality on the communication link between the target device and the home device; and
wherein the roaming application is configured to:
determine whether the communication link between the target device and the home device is available, wherein:
when the communication link is available, the roaming application may return from the target device to the home device in response to the return event; and
when the communication link is not available, the roaming application is configured to determine whether a communication link between the target device and a server is available; and
automatically roam from the target device to the server, instead of the home device, when the communication link between the target device and the home device is not available and the communication link between the target device and the server is available.

7. The home device of claim 6, wherein the communication to the target device in response to the return event comprises a remote procedure call to a target device interface, the remote procedure call comprising an instruction to the roaming application to return to the home device.

8. The home device of claim 6, wherein the operating system comprises a user interface feature configured to initiate return of the roaming application from the target device, and wherein the user command comprises a command received via the user interface feature.

9. The home device of claim 6, wherein when the return event comprises the interruption or degradation of signal quality, the interruption or degradation of signal quality comprises a degradation of signal quality due to a wireless range between the home device and the target device.

10. The home device of claim 6, wherein the operating system comprises instructions to retrieve the roaming application from the server, in response to a failure of the roaming application to return to the home device.

11. A target device configured to provide an execution environment for a roaming application, and configured to return the roaming application to a home device associated with an owner of the roaming application, the target device comprising:
a processor;
a memory;
an operating system loadable into the memory and configured to execute on the processor, wherein the operating system is configured to:
manage an execution environment for the roaming application;
transfer the roaming application from the target device to the home device, the transfer comprising:
transfer of one or more of roaming application state information and roaming application executable code to the home device; and
wherein the operating system is configured to initiate return of the roaming application from the target device to the home device, through transfer of one or more of roaming application state information and roaming application executable code from the target device to the home device, in response to a return event, the return event comprising one or more of:
- an automatically initiated return command from the roaming application;
- an interruption or degradation of signal quality on a communication link between the target device and the home device;
- detection of a return signal from the home device; and/or
- detection of a failure in the target device; and wherein the operating system is configured to:
- determine whether the communication link between the target device and the home device is available, wherein:
  - when the communication link is available, the roaming application may be returned from the target device to the home device in response to the return event; and
  - when the communication link is not available, the operating system is configured to determine whether a communication link between the target device and a server is available; and
- automatically transfer the roaming application from the target device to the server, instead of the home device, when the communication link between the target device and the home device is not available and the communication link between the target device and the server is available.

12. The target device of claim 11, further comprising an interface accessible via the communication link between the target device and the home device, wherein the interface is configured to process received instructions to return the roaming application to the home device.

13. The target device of claim 11, wherein the operating system is configured to initiate return of the roaming application from the target device to the home device, through transfer of one or more of roaming application state information and roaming application executable code from the target device to the home device, in response to a return event comprising completion of a designated task by the target device on behalf of the roaming application.

14. The target device of claim 11, wherein when the return event comprises the detection of the failure in the target device, the failure in the target device comprises a failure by the target device to perform one or more instructions associated with the roaming application.

15. The target device of claim 11, wherein the automatically initiated return command from the roaming application comprises a command generated by the roaming application without interaction with the home device and without interaction with a user of the target device.

16. The target device of claim 11, wherein when the return event comprises the interruption or degradation of signal quality, the interruption or degradation of signal quality comprises a degradation of signal quality due to a wireless range between the home device and the target device.

* * * * *